Patented Jan. 20, 1942

2,270,504

UNITED STATES PATENT OFFICE 2,270,504

CATALYST

Robert E. Burk and Everett C. Hughes, Cleveland Heights, Ohio, assignors to The Standard Oil Company, Cleveland, Ohio, a corporation of Ohio No Drawing. Application March 23, 1939, Serial No. 263,806

11 Claims. (Cl. 252—231)

It has been known for some time that aliphatic or naphthenic hydrocarbons can be converted into aromatic hydrocarbons by contact at elevated temperatures with a catalyst, which fundamentally has been of chromium oxide. Operation by such catalyst however is under a disadvantage of encountering deterioration after a relatively short run, and regeneration of the catalyst is beset with practical difficulties, such catalyst being very critical. We have now found that superior operations may be had, based on catalytic materials of a different source and kind of preparation, in contrast to practices heretofore. The operation is particularly satisfactory in its high yield and the uniformity of the catalyst, and its satisfactoriness of regeneration are especially outstanding.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

Where catalysts are prepared by dumping the proportional theoretical amounts of metal salts and a precipitating hydroxide together as has been the customary procedure heretofore, we find that the catalysts are non-uniform, and in a given particle a very wide difference in composition may be found from the outer surface in. This, we have found, is connected with the general tendency of the catalysts to show a poorly-sustained behavior and variable regeneration. In contrast with such procedure, the present invention, in precipitating a catalytic material provides the precipitant at a rate which at any given moment is short of that theoretically required for precipitation, and conveniently the mixing is accomplished by simultaneous feeds of the materials, at suitable relative rates for such condition, and at the end of the mixing, the deficiency of the precipitator is supplied to complete the precipitation. Furthermore, this manner of formation of catalytic materials, is found by us to be particularly advantageous with iron oxide and alumina. Alumina and an oxide of metals of atomic number 26—27 are of great practical utility, or for some uses atomic number 26—28, and in some cases the range may be extended as elements of atomic number 25—28, i. e. manganese, iron, cobalt and nickel. It will be understood that there are some peculiarities which distinguish the groupings as we have just stated foregoing.

As examples illustrating the process and showing typical catalysts thus prepared, the following may be noted:

I. Ferric nitrate and aluminum nitrate are dissolved in distilled water at the rate of 81 parts by weight of the former and 300 parts of the latter to 2,000 parts of water. Similarly, 3.17 N ammonium hydroxide is dissolved in distilled water at the rate of 665 parts to a make up of 2,000 parts of water (which is 70 per cent of the theoretically required ammonia precipitant). These solutions are fed at equal rates, by pumping into a reaction vessel which has been charged with 120 parts of ammonium acetate and 4,000 parts of water. After the progressive and simultaneous addition of the solution of metal salts and solution of ammonia to the reaction vessel, a further addition of 85 parts of concentrated ammonia in 500 parts of water is fed in to finish the precipitation. The precipitate is filtered, washed, and dried, and is ready for the further operation which will be described hereinafter. This catalytic material is a 20:80 mol per cent $Fe_2O_3 \cdot Al_2O_3$ catalyst, and is remarkably uniform in composition.

II. Aluminum nitrate and cobalt nitrate are dissolved in distilled water at the rate of 0.8 mol of aluminum nitrate and 0.2 mol of cobalt nitrate with 2,000 parts by weight of water. Concentrated ammonium hydroxide as above noted, is also dissolved in distilled water at the rate of 6.2 parts of the ammonia to a make up of 2,000 parts of water (70 per cent of the theoretical requirement for a complete precipitation). The two solutions are fed simultaneously and through a period of ten minutes, into a reaction vessel which contains 120 parts of ammonium acetate in 4,000 parts of water. The two solutions having been completely fed in, sufficient ammonium hydroxide is added, like in the foregoing, to complete the precipitation, and the precipitate is filtered, washed, and dried.

III. Aluminum nitrate and nickel nitrate are dissolved in water at the rate of 0.8 mol of aluminum nitrate and 0.2 mol of nickel nitrate to a make up of 1,420 parts of water. This solution is fed, and at the same time ammonia gas is fed, through a period of five minutes, (the ammonia going to 70 per cent of the theoretically required precipitate amount), the feeding of the components being to a reaction vessel containing 120 parts of ammonium acetate to 6,500 parts of water. These components having been completely added, the rest of the theoretically required amount of ammonia for precipitation is added over a period of two and a half minutes. The precipitate is finally filtered, washed, and dried.

The catalyst thus prepared may be granulated or pelleted, and is placed in a reacting zone with suitable heating means such that the temperature of the mass may be maintained around 932° F., and preferably not under 700° nor over 1250° F. The pressure may be atmospheric or up to not in excess of about 400 pounds per square inch. To the catalytic material there is then supplied a hydrocarbon, such as n-hexane, cyclohexane, heptane, octane, etc., or naphthas or distillates from non-benzenoid stocks, for instance Pennsylvania, Michigan, Kentucky, Mid-Continent, Ohio, and the like petroleum. Pennsylvania or Michigan naphtha in the boiling range 140–420° F. is particularly advantageous. The hydrocarbon is contacted with the catalyst at a rate of feed depending upon the operating temperature, and which in general may be 0.1 to 10 liters of liquid per each liter of catalyst. With particular advantage, the product from the treating zone may be subjected to a solvent having selective solventicity, such as liquid sulphur dioxide or a high boiling amine or hydroxide, and the portion of the product not dissolved by the solvent, may on separation therefrom be repassed through the catalytic zone. For illustration, Michigan petroleum naphtha thus subjected to the action of an $Al_2O_3.Fe_2O_3$ catalyst consisting of 80 mol per cent Al and 20 mol per cent Fe, at a temperature of 932° F. and a flow rate of one and three-fourths grams of naphtha per hour per each gram of catalyst, yields a product having a Kattwinkel test of 34 per cent and bromine number 11. Again, a similar naphtha contacted with an $Al_2O_3.CoO$ catalyst under like conditions, yielded a product having a Kattwinkel test 30 per cent and bromine number 16.8. It will be understood that the Kattwinkel test represents the volume per cent of a sample of the product absorbed by 96 per cent sulphuric acid to which has been added 30 per cent by weight of $P_2O_5$. This percentage represents the total percentage of aromatics and unsaturates in the sample tested.

When the catalyst activity declines to an undesirable or predetermined point, the hydrocarbon feed may be shut off, and oxygen-containing gas, as air or air diluted with inert gas, may be passed over the catalyst which may be maintained at elevated temperature. The present alumina catalysts in fact regenerate particularly well and retain their activity. For example, 20:80 iron and aluminum oxide catalyst yielding a product, at a temperature of around 932° F., showing a Kattwinkel test of 42 per cent, after regenerating with air and dissimilar maintained temperature, on re-feed of the hydrocarbon again showed a Kattwinkel test of 42 per cent, feed rate being the same as in the first run, and similarly on further regeneration.

The feed of the hydrocarbon to the catalytic zone may be diluted to advantage with hydrogen or the off-gas from the process may be recycled back for this purpose. In some cases steam or flue gas may be used as diluent. By returning the hot carbon dioxide formed in regenerating, heat may be also supplied to the catalyst bed.

It is to be noted that the preparation of catalytic masses in accordance with the manner we have set forth, is especially advantageous from the ease with which a catalyst can be duplicated exactly from batch to batch. Heretofore, variation of catalysts has been an annoying difficulty, particularly where large scale production is required. And, not only is there uniformity from batch to batch, but through the material itself there is homogeneity such as has not been obtainable by prior procedures.

Other modes of applying the principle of the invention may be employed, change being made as regards the details described, provided the features stated in any of the following claims, or the equivalent of such, be employed.

We therefore particularly point out and distinctly claim as our invention:

1. In a process of making a catalyst, feeding at equal rates a solution of ferric nitrate and aluminum nitrate and a solution of ammonia containing approximately seventy per cent of that theoretically required to precipitate out all of the iron and aluminum ions present, into a reaction zone containing a solution of ammonium acetate, thereby permanently precipitating out some of the iron and aluminum ions while leaving a surplus thereof un-precipitated, and after such addition is completed adding ammonia solution sufficient to precipitate the remainder of the iron and aluminum ions, filtering, washing, and drying the precipitate.

2. In a process of making a catalyst, feeding at equal rates a solution of cobalt nitrate and aluminum nitrate and a solution of ammonia containing approximately seventy per cent of that theoretically required to precipitate out all of the cobalt and aluminum ions present, into a reaction zone containing ammonium acetate solution, thereby permanently precipitating out some of the cobalt and aluminum ions while leaving a surplus thereof unprecipitated, and after such addition is completed adding ammonia solution to precipitate the remainder of the cobalt and aluminum ions, filtering, washing, and drying the precipitate.

3. In a process of making a catalyst, feeding a solution of aluminum nitrate and nickel nitrate and at the same time feeding ammonia gas at a rate approximately seventy per cent of that theoretically required to precipitate out all of the aluminum and nickel ions present, into a reaction zone containing ammonium acetate solution, thereby permanently precipitating out some of the aluminum and nickel ions while leaving a surplus thereof un-precipitated, then feeding in the rest of the theoretically required amount of ammonia to precipitate the remainder of the aluminum and nickel ions, filtering, washing, and drying the precipitate.

4. In a process of making a catalyst, simultaneously feeding a solution of salts of aluminum and a metal of the group consisting of those metals having atomic numbers from 26 through 28, and ammonia in amount approximately seventy per cent of that theoretically required to precipitate out all of the ions of aluminum and said other metal, into a reaction zone containing ammonium acetate solution, thereby permanently precipitating out some of the ions of aluminum and the metal of the group consisting of those metals having atomic numbers from 26 through 28 while leaving a surplus thereof un-precipitated, and after such addition is completed adding ammonia to precipitate the remainder of the stated metal ions.

5. In a process of making a catalyst, feeding at equal rates a solution of salts of aluminum and of a metal of the group consisting of those metals having atomic numbers from 26 through 28, and ammonia in amount approximately seventy per cent of that theoretically required to precipitate all of the ions of aluminum and said other metal, thereby permanently precipitating out some of the ions of aluminum and the metal of the group consisting of those metals having atomic numbers from 26 through 28 while leaving a surplus thereof un-precipitated, and after such feed is completed adding ammonia solution to precipitate the remainder of the stated metal ions, filtering, washing, and drying.

6. In a process of making a catalyst, feeding a solution of salts of aluminum and a metal of the group consisting of those metals having atomic numbers from 26 through 28, and at the same time feeding ammonia gas at a rate approximately seventy per cent of that theoretically required to precipitate out all of the ions of aluminum and said other metal, into a reaction zone containing ammonium acetate solution, thereby permanently precipitating out some of the ions of aluminum and the metal of the group consisting of those metals having atomic numbers from 26 through 28 while leaving a surplus thereof un-precipitated, then feeding in the rest of the theoretically required amount of ammonia to precipitate the remainder of the stated metal ions.

7. In a process of making a catalyst, feeding a solution of salts of aluminum and a metal of the group consisting of those metals having atomic numbers from 26 through 28, and at the same time feeding ammonia gas at a rate approximately seventy per cent of that theoretically required to precipitate out all of the ions of aluminum and said other metal while leaving a surplus thereof un-precipitated, and finally adding the rest of the theoretically required amount of ammonia to precipitate the remainder of the stated metal ions.

8. A catalyst for aromatizing or dehydrogenating, consisting of the product resulting from the process of claim 1.

9. A catalyst for aromatizing or dehydrogenating, consisting of the product resulting from the process of claim 2.

10. A catalyst for aromatizing or dehydrogenating, consisting of the product resulting from the process of claim 3.

11. A catalyst for aromatizing or dehydrogenating, consisting of the product resulting from the process of claim 4.

ROBERT E. BURK.
EVERETT C. HUGHES.